Sept. 2, 1947.  J. E. LINDBERG  2,426,625
ICING DETECTION DEVICE
Filed Jan. 29, 1943  4 Sheets-Sheet 1
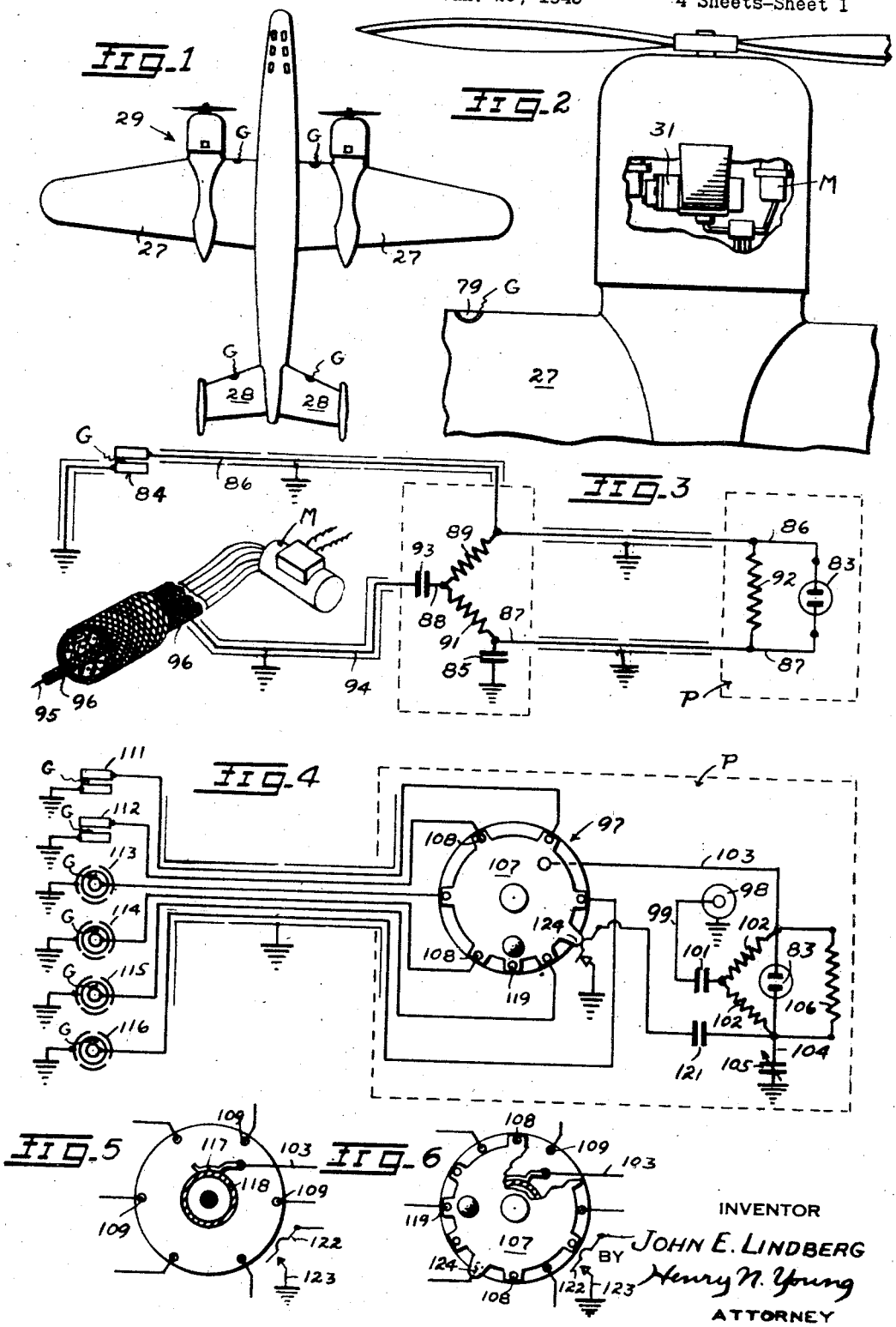
INVENTOR
JOHN E. LINDBERG
BY Henry N. Young
ATTORNEY Sept. 2, 1947.　　　　J. E. LINDBERG　　　　2,426,625
ICING DETECTION DEVICE
Filed Jan. 29, 1943　　　　4 Sheets-Sheet 2
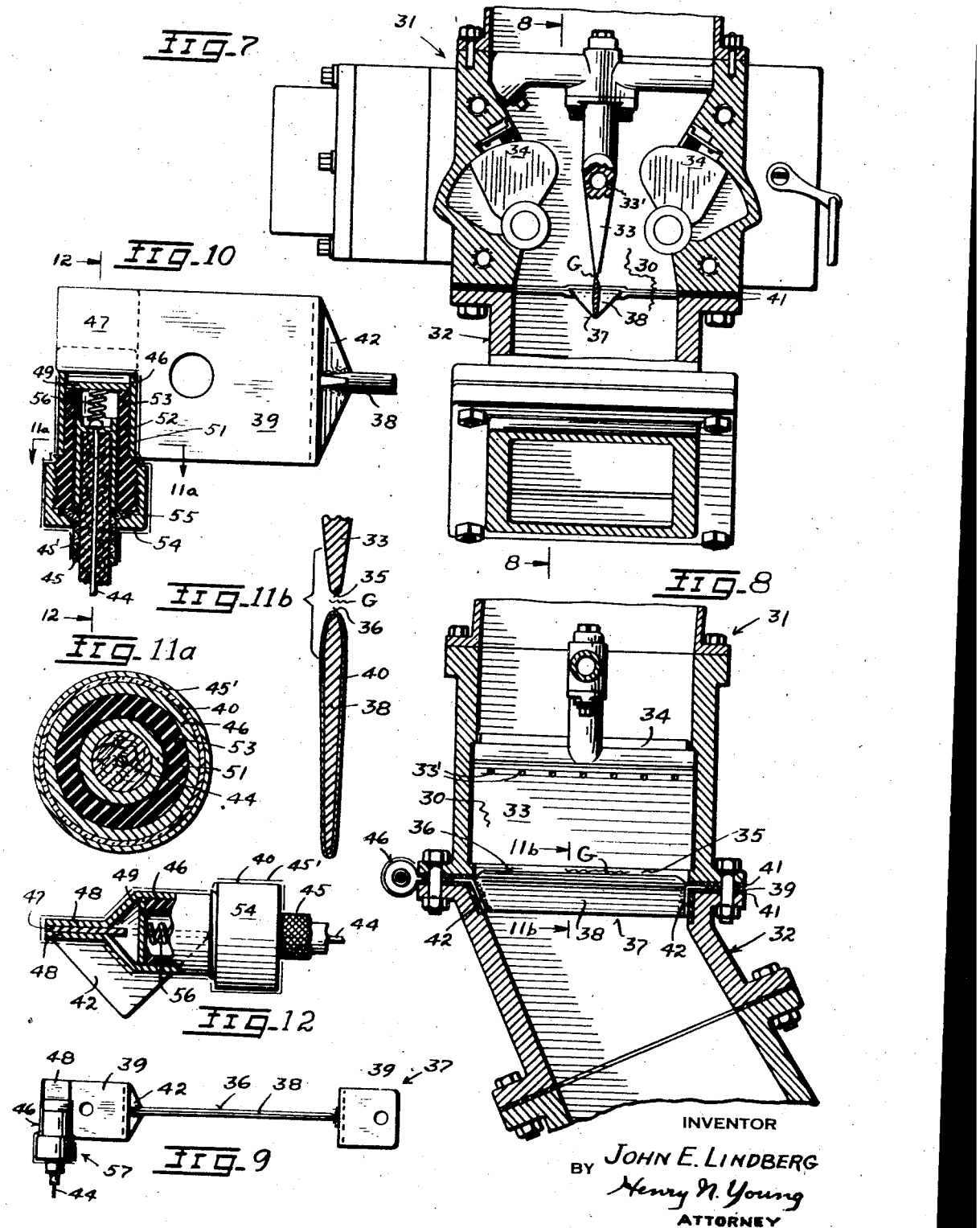
INVENTOR
BY JOHN E. LINDBERG
Henry N. Young
ATTORNEY Sept. 2, 1947.  J. E. LINDBERG  2,426,625
ICING DETECTION DEVICE
Filed Jan. 29, 1943  4 Sheets-Sheet 3
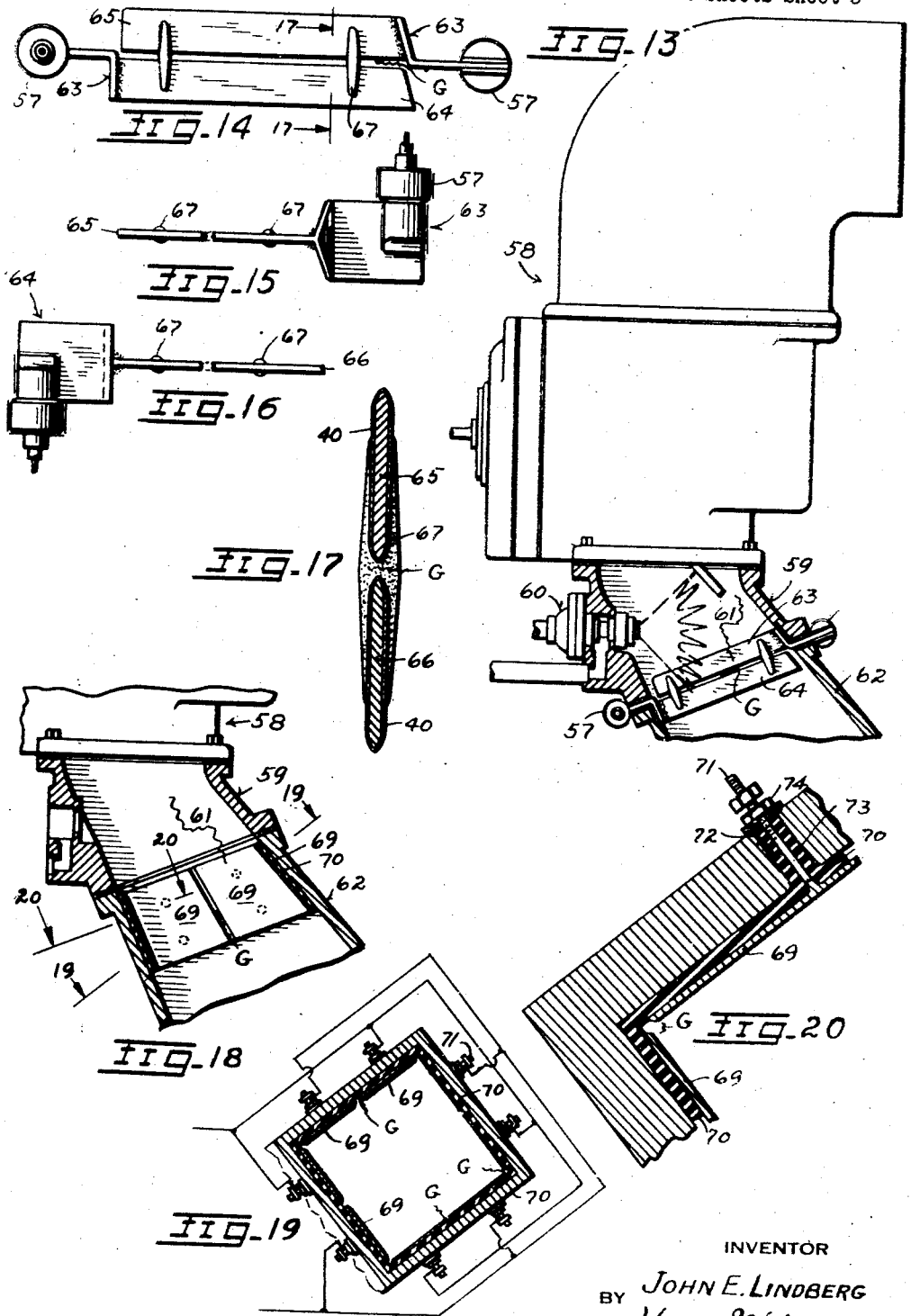
INVENTOR
BY JOHN E. LINDBERG
Henry N. Young
ATTORNEY Sept. 2, 1947.   J. E. LINDBERG   2,426,625
ICING DETECTION DEVICE
Filed Jan. 29, 1943   4 Sheets-Sheet 4
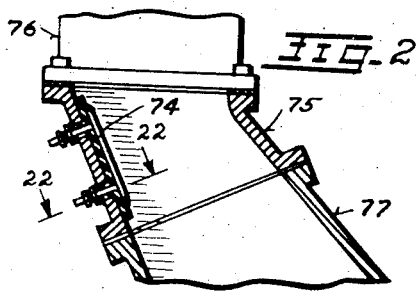
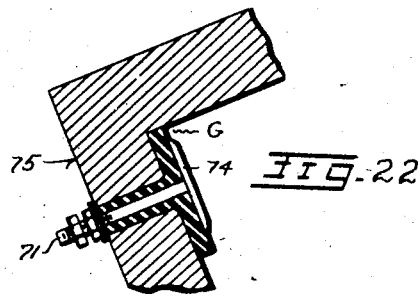
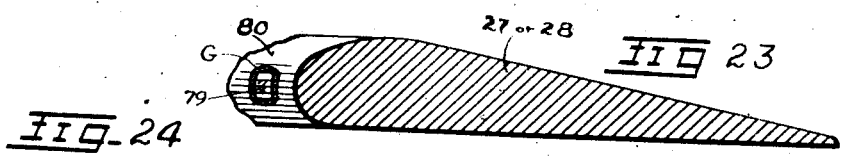
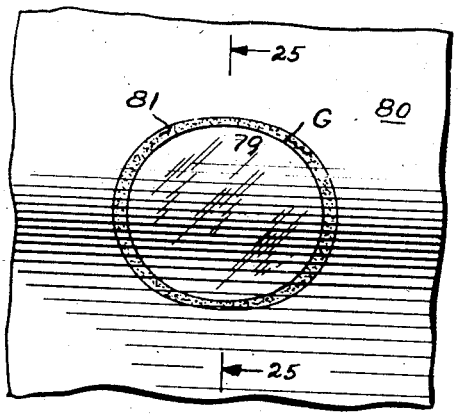
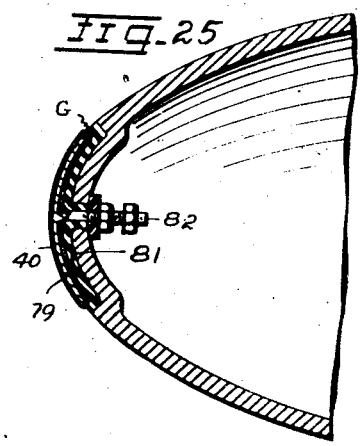
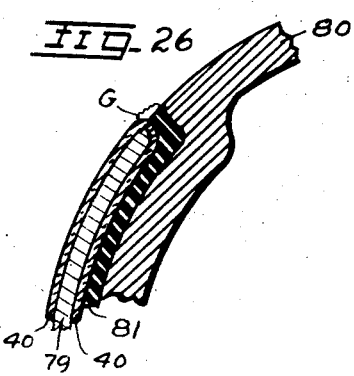
INVENTOR
JOHN E. LINDBERG
BY Henry N. Young
ATTORNEY Patented Sept. 2, 1947

2,426,625

UNITED STATES PATENT OFFICE 2,426,625

ICING DETECTION DEVICE

John E. Lindberg, Lafayette, Calif.

Application January 29, 1943, Serial No. 473,981

3 Claims. (Cl. 177—311)

The invention relates generally to a device for the detection and indication of a deposit of material at a particular location, and more specifically to the formation of ice in fuel induction systems, or on exposed surfaces, of aircraft.

An object is to provide a particularly reliable device for indicating the formation of ice in the fuel induction system of an internal combustion engine, whereby to permit safe engine operation with a full-cold carburetor setting and the accompanying highest engine efficiency and power.

Another object is to provide an improved means for indicating the ice coating of a normally ice-free exposed surface.

A further object is to directly utilize the dielectric qualities of a deposited material as an indicator control means.

The invention possesses other objects and features of advantage, some of which, with the foregoing, will be set forth or be apparent in the following description of typical embodiments of the invention, and in the accompanying drawings, in which, Figure 1 is a plan view of an airplane having the device of present invention variously applied thereto for the detection of the formation of ice at certain points of the airplane.

Figure 2 is an enlarged fragmentary view of the airplane taken at a propelling motor thereof, a portion of the motor housing being broken away at the engine carburetor and magnetos.

Figure 3 is a schematic diagram showing an indicator circuit and means for the detection of the formation of ice in an engine carburetor, as that of the airplane.

Figure 4 is a schematic showing of a circuit which is usable for the selective indication of the formation of ice in the carburetor or at certain exposed points of an airplane.

Figures 5 and 6 are fragmentary views of a selector switch of Figure 4.

Figure 7 is an enlarged front view of the engine carburetor and its associated adapter, the carburetor having its front side plate removed and the adapter being shown in section.

Figure 8 is a sectional view taken at the line 8—8 in Figure 7.

Figure 9 is a plan view of an electrode member of Figures 7 and 8.

Figure 10 is an enlarged fragmentary view of the electrode shown in Figure 9, a conductor connection therefor being shown in axial section.

Figure 11a is an enlarged fragmentary sectional view taken at the line 11—11a in Figure 10, thickness being exaggerated.

Figure 11b is an enlarged fragmentary sectional view taken at the line 11b—11b in Figure 8, thickness being exaggerated.

Figure 12 is a partially sectional view taken at the line 12—12 in Figure 10.

Figure 13 is a side view of a different type of carburetor than that shown in Figures 1 and 7 and 8, the adapter portion of this carburetor being shown in section.

Figure 14 is an enlarged view of an electrode member of Figure 13.

Figures 15 and 16 are fragmentary plan views of different elements of the member of Figure 14.

Figure 17 is an enlarged transverse section at the line 17—17 in Figure 14, thicknesses being exaggerated.

Figure 18 is a fragmentary section showing the application of another embodiment of the device to the carburetor and adapter arrangement of Figure 13.

Figure 19 is a transverse section at the line 19—19 in Figure 18.

Figure 20 is an enlarged fragmentary section at the line 20—20 in Figure 18.

Figure 21 is a fragmentary sectional view showing another embodiment of the device as applied to a carburetor adapter.

Figure 22 is an enlarged fragmentary section taken at the line 22—22 in Figure 21.

Figure 23 is a fragmentary section showing the application of a different form of the device at the leading edge of an airplane wing or stabilizer.

Figure 24 is an enlarged front view of the showing of Figure 23.

Figure 25 is a section at the line 25—25 in Figure 24.

Figure 26 is an enlarged fragmentary view of the showing of Figure 25, thicknesses being exaggerated.

As disclosed, the device of my invention is applied for the detection of the formation of ice in the induction passage of an internal combustion engine and on the wings 27 and stabilizers 28 of an airplane 29. Essentially, the device comprises the provision of a special gap between capacity electrodes provided in a high-frequency circuit including a suitable indicator means which is actuable by a change in the dielectric conditions across said gap. In the present application of the device, the indicator means is arranged to be actuated by and upon a formation and/or deposit of ice in a gap G provided between capacity electrodes suitably provided at a circuit point in a zone normally containing only gaseous material including water vapor and where the formation of ice may be expected to first occur under icing conditions; for descriptive convenience, the gaps G are herein referred to as "dielectric gaps."

Figures 7 to 12 disclose the provision of a dielectric gap G within a discharge passage 30 of a carburetor 31, said passage being defined in part within a usual tubular adapter 32 through which the carbureted fuel is conveyed to the intake manifold of its engine. The present carburetor 31 is of the type in which a wedge-shaped fuel discharge nozzle 33 is disposed between Venturi throttle members 34 which are swingably adjustable about axes parallel to the nozzle plane to provide an adjustable air flow passage along the nozzle toward its apical edge 35, the fuel being supplied in said passages through usual ports 33' of the nozzle. The generally disclosed carburetor 31 is of the "Holly" aircraft type, and is bolted upon the adapter 32, the plane of connection of the carburetor and adapter being adjacent the straight nozzle edge 35.

In the present arrangement, the nozzle 33 is utilized as a plate or electrode defining one side of a dielectric gap G, and a member 37 provides the other electrode of the gap. As shown, the member 37 includes a generally flat strip 38 of electrically conductive material for spanning the passage 30 in the plane of the nozzle 33 with its upper edge 36 in spaced parallel relation to the nozzle edge 35 to define the dielectric gap G between said edges. The connection between the carburetor and adapter may be utilized for mounting the member 37 in its operative position by providing the member with flat extensions 39 in the form of end flanges for gripped engagement between the opposed faces of the carburetor and adapter. The flanges 39 may be perforated to freely receive the connecting bolts therethrough, and may be engaged between gasket members 41 of insulating material at the connection.

In the present structure of the member 37, the end flanges 39 are provided by members having inner end portions 42 triangular and downturned to generally parallel the opposed faces of the adapter passage thereat, and have the plate-like electrode 38 fixed integrally to and between the portions 42 in a suitable manner. The plate element 38 is preferably of streamline cross-section with the edge 36 its leading edge whereby to minimize frictional resistance to the flow of the fuel mixture in the passage 30. Noting that the member 37 provides one side of a dielectric gap G in a high-frequency indicator circuit, it is desirable that this member be particularly well insulated, and to the latter end, the member is preferably completely coated with a relatively thin layer 40 of an insulating material having a highly capacitative dielectric constant, a ceramic, or porcelain, glazing being a preferred coating; the provision of the coating 40 is brought out in Figures 11a and 11b.

Understanding that the leads of a high-frequency circuit to include the gap G should also be insulated or shielded against electrical interference, as by a grounded tubular metal shield or shroud 45, the connection for a lead 44 to the member 37 is such as will maintain the desired insulation condition thereat. As particularly shown, a metallic member 46 is provided for mounting on an extension 47 of a flange 39, said extension comprising an integral continuation of the flange, but extending for only approximately one-half of its width. The member 46 is shaped as from a piece of tube which is flattened for a portion of its length and has its flattened portion cut off in the line of the cylinder of its unflattened portion to provide lips 48 for receiving the extension 47 between them, the member 46 being integrally fixed to the flange in a suitable manner, as by welding at the line of engagement of the members. At the inner end of its tubular portion, the member 46 is partitioned by a metallic disc 49 fixed therein and arranged to provide the contact point with the member 37 for the lead 44. Except for a limited central contact zone at the outer face of the disc 49, the disc and member 46 have the glazed insulating coating 40 of the rest of the member 37.

For providing an electrical connection of the lead 44 with the disc 49, a cap-like metallic member 51 is mounted at the end of the lead to receive the insulation for the wire and has its closed end 52 perforated for receiving a bared end portion of the lead wire therethrough for soldering in place thereat, said member being disposed slightly inwardly of the adjacent extremity of the cap. The cap member 51 is slidably engaged in a sleeve member 53 of insulating material having an inner portion thereof arranged for fixed insertion within the tubular portion of the member 46 to engage the disc 49 and having its extended portion externally threaded to mount a ring cap 54 arranged to receive the shroud 45 of the lead 44 through its opening.

In connecting the lead to the member 37, the shielding shroud 45 is turned outwardly adjacent the outer end of the cap member 51 to provide a radial flange 55 about the lead and its insulation thereat, and the flange 55 is arranged for clamped engagement between the opposed faces of the sleeve 53 and the ring cap 54 to fix the shroud and lead to the member 46. A compression contact spring 56 is seated between the disc 49 and the cap end 52, the screwing down of the cap 54 being arranged to compress the spring 56 in its place to provide a direct electrical connection between the disc and cap end; in this manner, a sealed-in connection 57 is provided between the lead 44 and the electrode member 47. Before the cap 54 is applied, the porcelain-coated extending portion of the member 37 is preferably over-coated with metal, as by applying a metallizing spray thereto, to provide, in effect, an extension 45' of the shielding shroud 45 over the exposed portion of the member 37 when the ring cap 54 is operatively installed.

Figures 13 to 17 disclose a means for providing a dielectric gap G in connection with a downdraft carburetor 58, such as a "Stromberg" injection carburetor, having the spray discharge of fuel taking place obliquely into an adapter 59 from a nozzle element 60 in such a manner that the evaporation of the fuel takes place adjacent the discharge end of the adapter passage 61. The lower end of the adapter 59 is arranged for bolted connection to the intake nozzle 62 of the engine to be supplied with carbureted fuel, and electrode members 63 and 64 providing the present gap G between them are arranged for mounting across the passage 61 and its continuation in the manifold 62 at the juncture of the adapter and the manifold nozzle. As particularly shown, each electrode 63 and 64 generally resembles an electrode 37 of the first embodiment except that only one end thereof provides a flange for gripping between the exposed adapter and nozzle ends. At the flanged ends thereof, the electrodes 63 and 64 are preferably provided with a lead connection 57 such as that provided for the electrode member 37.

Noting that the plates 65 and 66 of the electrodes 63 and 64 respectively are secured only at one side of the passage 61, and comprise relatively thin elements in mutually coplanar relation while providing a uniform gap G between their opposed edges, means are preferably provided to mutually secure the plates in such unitary relation as to avoid flutter of the plates in the stream of carburetted fuel, whereby the associated electrodes comprise a two-electrode unit. As illustrated, the plates 65 and 66 are connected with each other near their different ends with ribs 67 of suitable insulating material, and the complete two-electrode units is preferably fully coated with a ceramic glazing 40 for preventing an electric leakage to or from the electrodes. It will be understood that the present electrode unit is adapted for inclusion in an ungrounded circuit, or in a grounded circuit by grounding one electrode, whereas the previously described electrode 37 is arranged for inclusion in a circuit with the grounded carburetor nozzle. In the latter connection, it will be understood that the electrode members 37 are readily adaptable for mounting in pairs between the adapter 61 and nozzle 62 to provide the operative equivalent of the gap-providing unit 65—66 thereat.

Figures 18 to 20 disclose gap-providing electrodes arranged around the sides of the passage 61 instead of across said passage. As particularly illustrated, a series of electrode plates 69 is mounted within the upper end of the manifold nozzle 62, with the plates 69 laterally spaced to provide dielectric gaps G between their adjacent edges. At the plates 69, the sides of the passage 61 are lined with insulation 70, and said plates are provided with securing bolts 71 for extension through holes 72 in the nozzle sides, said holes being lined with insulation sleeves 73 which sealedly receive the bolts 71 therethrough. Nuts 74 engage the outer ends of the bolts 71 for clamping the electrode plates 69 in thier places, and one bolt for each plate is used as a binding-post connection for the plates. The electrodes 71 would preferably be coated with a ceramic glaze 40 as before.

Figures 21 and 22 disclose an arrangement in which a single plate 74 which is insulated and formed generally as an electrode plate 69 of the embodiment of Figures 18 to 20 is mounted on a wall of an adapter 75 connecting a carburetor 76 with an intake nozzle 77. The gap G, in this instance, is provided between an edge of the electrode plate 74 and the side of the fuel passage which intersects the wall on which the electrode 74 is mounted.

Since, under certain weather conditions, ice may form and accumulate as a deposit upon the exterior surface of aircraft, the present invention contemplates the provision of the present ice detection device at those points on exposed aircraft surfaces where the formation of ice is apt to first occur. As applied to the airplane 29, external points where ice deposits may be expected to first occur under icing conditions are, for instance, at the leading edges of the wings 27 and the stabilizers 28, and, as indicated in Figures 1 and 23 to 26, dielectric gaps G are accordingly provided at points on the leading edges of the wings and stabilizers. In the present instance, electrode plates 79 of more or less circular outline are accordingly provided at the said leading edges of the wings and stabilizers for providing the desired dielectric gaps G between their peripheral edges and the metal shell or skin 80 of the part which mounts the electrode, the arrangement being target-like in appearance.

As particularly illustrated, the surface of the shell 80 is countersunk to complementarily receive an electrode 79 and a layer of insulation 81 between the electrode and shell, the arrangement preferably being such that the exposed face of the electrode 79 is generally flush with the shell surface adjacent its edges and a dielectric gap G is provided from its periphery over the exposed edge of the insulation 81. The electrode 79 is preferably provided with the ceramic coating 40 of the previously described electrodes, a mounting bolt 82 extending inwardly from a central point of the electrode through the shell and serving as a binding-post in a circuit including the electrode. With this construction, the shell 80 would be part of a grounded circuit providing a gap G over the annular exposed face portion of the insulation 81.

Having a dielectric gap G suitably provided as, for instance, in any of the herein described and illustrated manners, such a gap is arranged for its inclusion in a suitable capacity-change indicating and/or measuring circuit which may be energized by and upon the formation of ice in or across the gap to actuate a signal means of the circuit. By particular reference to Figure 3, a dielectric gap G is interposed in a circuit which is energized to light up a glow-discharge tube 83 when ice forms in or across said gap. In the present instance, the tube 83 has its terminals connected in a bridge circuit such that the tube is energized for its lighting only when the circuit conditions are suitably influenced by the formation of ice at the gap G in a more or less spanning relation thereto.

As particularly shown, an electrode of a gap G provided by an electrode assembly 84 and a plate of a condenser 85 are respectively connected to leads 86 and 87 of the tube 83, the numeral 84 being used to generically indicate any assembly providing a suitable dielectric gap G for installation and use in the described manner. Power for energizing the circuit is derived from a lead 88 connected with a suitable source of oscillating electromotive force and having branch connections with the tube leads 86 and 87 through resistances 89 and 91 respectively. A resistance 92 may be provided in parallel connection with the tube 83 for increasing the sensitivity of the tube as an indicator means. Oscillating power may be supplied to the power input lead 88 through a condenser 93 from a pick-up lead 94 deriving energy by induction from an ignition wire 95 which comprises one of a plurality of ignition wires which are periodically energized by a magneto M of the engine; for present pick-up purposes, the power lead 88 may be connected with a tubular metallic shield 96 enclosing a portion of the wire 95.

In the circuit of Figure 3, the circuit portion, including the indicator tube 83 and the resistance 92 is preferably provided at the instrument panel P of the airplane for ready reference. On the other hand, the condensers 85 and 93 and the resistances 89 and 91 are preferably provided in a unitary assembly immediately adjacent the carburetor, whereby the leads thereto from the gap and power source may be as short as possible for providing the highest possible sensitivity and accuracy of indication. Radiation of energy to or from all leads of a circuit is preferably prevented by enclosing the leads in grounded shields as is generally indicated. While the gap assembly 84 and condenser 85 are both shown as being grounded, it will be understood that their grounding leads might be connected to provide an ungrounded bridge circuit including the tube 83.

Figure 4 discloses a circuit which is arranged for the collective and/or selective indication of the formation of ice at any one of a number of gap-providing assemblies provided at different possible points of ice formation, said assemblies including the space-gap types of Figures 7 to 17 and the surface-gap, or target, types of Figures 18 to 26. In the present instance, a selector switch 97 is provided for collectively connecting all of the six ice detection gaps G provided on the airplane 29 with a capacity-comparison bridge circuit similar to that of Figure 3. When the formation of ice is indicated at the glow discharge tube 83, the switch 96 may be selectively set to individually connect the different gaps in a circuit for ascertaining the particular gap or gaps at which the ice has formed.

In the present circuit of which the gap and selector assembly comprises one branch, the necessary power is arranged to be derived from an oscillator 98, or other source of high-frequency oscillating current of the airplane equipment, by or through a lead 99 including a condensor 101 and branching beyond the condensor through resistances 102 to connections with the tube lead 103 from the selector 97 and a lead 104 from a variable condensor 105, a resistance 106 being connected in parallel with the tube 83. In this circuit, the selector switch 97 and the tube circuit are preferably provided at the instrument panel P, and all desirable shielding of leads is effected.

As illustrating a suitable switch structure for present purposes, the present selector switch 96 comprises a disc 107 mounted for rotation about its axis and provided with radial arms providing contacts 108 arranged to simultaneously engage fixed contacts 109 which are connected in branch circuits including gap-providing assemblies or units 111, 112, 113, 114, 115 and 116, the assemblies 111 and 112 generically representing those herein shown as providing gaps G within the fuel induction passage of an airplane engine, and the assemblies 113 to 116 representing those providing gaps G at the airplane wings and stabilizers. A fixed brush 117 is connected by the lead 103 to the indicator assembly and is mounted behind and opposite the disc 107 to constantly engage a coaxial contact ring 118 mounted on the back of the disc and electrically connected with the various contacts 108. The arrangement is such that when the various disc contacts 108 engage the fixed contacts 109, the various gap assemblies are connected in mutually parallel relationship to the indicator circuit through the ring 118 and the brush 117.

The present contacts 108 on the disc 107 are uniformly spaced in a circular line about the disc coaxial therewith and opposite the line of contacts 109, and a contact 119 provided on the disc between two of the arms 108 and electrically connected with the ring 118 is arranged for selective contact with any one of the fixed contacts 109 whereby only the gap of the engaged contact 109 may then be connected in the signal circuit. In the disclosed structure, the selector disc 107 is assumed to be of conducting material, with the contact arms 108 and 119 and the contact ring 118 comprising integral parts thereof. The fixed contacts 109 provide contact faces in a common plane, while the contacts 108 and 119 comprise spring-pressed brushes for contacting disposal over said faces. With the present arrangement, following an indication at the tube 83 that there is an ice deposit at at least one gap G of the units 111 to 116 inclusive, the selector disc may be set to ascertain the precise gap-providing assembly, or assemblies, at which ice has formed for providing the original signal, it being understood that all of the assemblies are temporarily connected in the indicator circuit as the selector contact 119 is moved to engage successive contacts 109.

To provide for like-capacity effects in the indicator circuit when either all the gaps or a selected gap are connected therein, a condenser 121 is provided in parallel connection with the variable condenser 105 and for grounding through a suitable switch which is so controlled by the position of the disc 106 that this condenser is grounded when, and only when, all of the gap-providing assemblies are connected in the signal circuit. As shown, a switch 122 is provided in the ground lead 123 of the condenser 121, and an arm 124 extending from the edge of the disc is operative to close said switch only when the disc is set in a predetermined position in which it connects all of the gaps G of the system in the glow tube circuit.

In order to avoid false indications or undue sensitiveness of the present indicator circuits, it is to be noted that no energizing of a gas glow tube 83 for the emission of visible light should be effected until a permitted minimum ice deposit occurs at a gap, and that the intensity of the light from the tube increases in proportion to the effective thickness of a bridge provided by an ice deposit and may be used as an indication of such thickness. Furthermore, it will be understood that the tube circuit might directly or indirectly energize a suitable meter device which may be calibrated in terms of the extent of ice deposit. In the arrangement of Figure 4, the lighted tube may be extinguished by suitably adjusting the variable condenser 105, the settings of said condenser being calibrated in terms of the amount of ice at a gap (detection point) whereby the reading for the condenser plate at its dim-out position may directly indicate the amount of ice formation.

Referring generally to the different assemblies providing the dielectric gaps G, it will be noted that the conductor elements providing the gaps are in all cases in edge-to-edge opposition rather than having faces thereof in mutual parallel opposition; for instance, the space gap assemblies of Figures 7 to 17, inclusive, and the surface gap assemblies of Figures 18 to 20 and 23 to 25 comprise mutually coplanar flat elements providing the gaps. The aforesaid arrangements are desirable where possible, as providing for a more uniform change in the effective capacity of the gap-providing assemblies as the ice formation increases.

The ceramic or other dielectric material used for complete insulation shielding coating of at least one electrode element of each assembly should preferably have a dielectric constant as high as possible and the coating 40 thereof should be as thin as possible while providing the required element insulation, it being noted that the effective dielectric gap G includes the thickness of the insulating coating upon the elements; if the coating is thin, whereby the air-occupied gap portion is relatively wide as compared with the coating thickness, the presence of ice in the gap portion normally containing only gaseous material produces the greatest possible change in the effective capacity of the assembly as a condenser, and so increases the sensitiveness of the device as a deposit detection means. Also, the coating 40 has the further important function of preventing the grounding of a coated electrode by reason of the deposit thereon of a grounded coating of the indicator-controlling dielectric.

While the present dielectric gap device for detecting an unwanted formation of ice specifically discloses the use of a glow tube as an indicating means, it will be understood that an indicating or recording voltmeter might be substituted for a tube 83 or be connected in parallel with the tube as an ice-formation indicator means. A suitable deicing apparatus (not shown) would be provided for use in removing the ice whose presence is indicated by the present device, and may be automatically operable with the indicating device. Furthermore, while the present dielectric gap device has been particularly disclosed as applied to the carburetor and exposed surfaces of an airplane, it will be understood that the principle and circuit may be applied in the indication and/or measuring of the thickness of deposits or formation of other solid material than ice in a given zone. Thus, the device might be readily adapted for use in determining the moisture content of materials such as lumber or paper, or the degree of concentration or specific gravity or composition of materials introduced in a gap G provided between suitably related gap-providing elements.

From the foregoing description taken in connection with the accompanying drawings, the advantages of the present device will be readily understood by those skilled in the art to which the invention appertains. While I have described the features and principles of operation of structures and arrangements which I now consider to be preferred embodiments of my invention, I desire to have it understood that the showing is primarily illustrative, and that such changes may be made, when desired, as fall within the scope of the following claims.

I claim:

1. In means for indicating the formation of ice in a zone subject to icing conditions and normally occupied by a gaseous mixture including water vapor as the source of the ice which may be formed in the zone, a condenser disposed in said zone and providing a dielectric gap arranged for the formation of ice therein under icing conditions in the zone, a balancing condenser disposed outside of said zone, a source of oscillating electrical energy, an electric glow-discharge tube having its different terminals connected through the different said condensers, and constant branch connections from said energy source to corresponding points of the connections between the tube and the different condensers for supplying operating energy to the glow tube by and upon the formation of ice in said dielectric gap of the first condenser.

2. In combination with a structure having different zones thereof normally occupied by a fluid material including a congealable substance in fluid form, said zones being independently subject to solidifying conditions for the substance and the dielectric constant of said substance being different when the substance is in its different forms, condensers comprising pairs of conductor plates providing gaps at the different said zones and arranged for the mutually independent formation in their gaps of solid bodies of the congealable substance, an indicator for electrical actuation, an electric circuit for the indicator including said different condensers in mutually parallel and normally closed branch circuits for actuating the indicator upon the formation of a solid body in any said gap, and a selector switch means of the circuit combination operative in the circuit branches to selectively open all but one of the circuits for utilizing the indicator to ascertain the particular gap at which the body has been formed.

3. In combination with a tubular structure providing a passage for a stream of gaseous fluid containing water vapor and in which icing conditions may obtain, said structure having axially separable sections, an ice-formation indicating means comprising a condenser having mutually insulated plates mounted across the passage and providing a gap between opposed edges thereof and arranged for the formation of ice thereon and in said gap when icing conditions obtain in the passage, at least one of said condenser plates being secured in its operative position by clamping between the opposed ends of the sections, an electrical circuit including said condenser, and an indicator in said circuit for actuation in accordance with the formation of ice in the condenser gap.

JOHN E. LINDBERG.

REFERENCES CITED

The following references are of record in the file of this patent:

UNITED STATES PATENTS

| Number | Name | Date |
|---|---|---|
| 2,133,483 | Shaw et al. | Oct. 18, 1938 |
| 1,984,166 | Walter | Dec. 11, 1934 |
| 2,285,152 | Firestone | June 2, 1942 |
| 2,123,812 | Stevens et al. | July 12, 1938 |
| 2,269,019 | Hall | Jan. 6, 1942 |
| 2,127,823 | Leifheit | Aug. 23, 1938 |
| 903,090 | Hopkins | Nov. 3, 1908 |
| 2,322,703 | Polin | June 22, 1943 |

FOREIGN PATENTS

| Number | Country | Date |
|---|---|---|
| 622,993 | Germany | Aug. 3, 1934 |
| 609,661 | Germany | Feb. 19, 1935 |

OTHER REFERENCES

L'Aerotechnica, page 898, August, 1939.